(12) United States Patent
Townsend et al.

(10) Patent No.: US 8,869,673 B2
(45) Date of Patent: Oct. 28, 2014

(54) STRUCTURAL PANEL WITH BALLISTIC PROTECTION

(75) Inventors: William A. Townsend, Newport News, VA (US); Thomas A. Carstensen, Shelton, CT (US); Connie E. Bird, Rocky Hill, CT (US); John E. Holowczak, S. Windsor, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 2235 days.

(21) Appl. No.: 11/735,594

(22) Filed: Apr. 16, 2007

(65) Prior Publication Data

US 2013/0340601 A1 Dec. 26, 2013

Related U.S. Application Data

(63) Continuation-in-part of application No. 11/627,491, filed on Jan. 26, 2007, now Pat. No. 8,709,584, and a continuation-in-part of application No. 11/682,390, filed on Mar. 6, 2007.

(60) Provisional application No. 60/764,047, filed on Jan. 31, 2006, provisional application No. 60/794,276, filed on Apr. 20, 2006.

(51) Int. Cl.
| | | |
|---|---|---|
| *F41H 5/00* | (2006.01) | |
| *B64D 7/00* | (2006.01) | |
| *F41H 5/04* | (2006.01) | |
| *B64D 9/00* | (2006.01) | |
| *B64C 1/20* | (2006.01) | |
| *F41H 5/013* | (2006.01) | |
| *B64C 27/04* | (2006.01) | |

(52) U.S. Cl.
CPC . *B64D 7/00* (2013.01); *B64C 27/04* (2013.01); *F41H 5/0428* (2013.01); *B64D 9/003* (2013.01); *B64C 1/20* (2013.01); *Y02T 50/46* (2013.01); *F41H 5/0421* (2013.01); *F41H 5/013* (2013.01)
USPC ....... 89/36.01; 89/36.02; 89/36.04; 89/36.07; 89/36.08

(58) Field of Classification Search
USPC ............ 89/36.01, 36.02, 36.04, 36.07, 36.08
See application file for complete search history.

(56) References Cited

U.S. PATENT DOCUMENTS

| | | |
|---|---|---|
| 4,179,979 A | 12/1979 | Cook et al. |
| 4,398,446 A | 8/1983 | Pagano et al. |
| 4,593,870 A | 6/1986 | Cronkhite et al. |

(Continued)

FOREIGN PATENT DOCUMENTS

| | | | |
|---|---|---|---|
| WO | WO03010484 | * | 2/2003 |

OTHER PUBLICATIONS

B. Matchen, "Applications of Ceramics in Armor Products," Key Engineering Materials, vols. 122-124 (1996) pp. 333-342.

(Continued)

*Primary Examiner* — J. Woodrow Eldred
(74) *Attorney, Agent, or Firm* — Carlson, Gaskey & Olds P.C.

(57) ABSTRACT

An armor system which integrates ballistic protection into load bearing structure. Each armored panel is manufactured as a sandwich structure having a multiple of layers including a hard ballistic material layer of a Ceramic/CMC hybrid armor material capable of defeating high velocity Armor Piercing projectiles.

23 Claims, 15 Drawing Sheets

(56) References Cited

U.S. PATENT DOCUMENTS

| | | |
|---|---|---|
| 4,739,690 A | 4/1988 | Moskowitz |
| 4,876,941 A | 10/1989 | Barnes et al. |
| 5,025,707 A | 6/1991 | Gonzalez |
| 5,060,553 A | 10/1991 | Jones |
| 5,179,244 A | 1/1993 | Zufle |
| 5,293,806 A | 3/1994 | Gonzalez |
| 5,402,703 A | 4/1995 | Drotleff |
| 5,443,882 A | 8/1995 | Park |
| 5,443,883 A | 8/1995 | Park |
| 5,451,015 A | 9/1995 | Cronkhite et al. |
| 5,516,595 A | 5/1996 | Newkirk et al. |
| 5,547,536 A | 8/1996 | Park |
| 5,576,508 A | 11/1996 | Korpi |
| 5,686,689 A | 11/1997 | Snedeker et al. |
| 5,918,309 A | 7/1999 | Bachner, Jr. |
| 6,009,791 A | 1/2000 | Medlin |
| 6,073,884 A | 6/2000 | Lavergne |
| 6,138,949 A | 10/2000 | Manende et al. |
| 6,253,655 B1 | 7/2001 | Lyons et al. |
| 6,327,954 B1 | 12/2001 | Medlin |
| 6,427,945 B1 | 8/2002 | Bansemir |
| 6,513,756 B1 | 2/2003 | Lambiaso |
| 6,532,857 B1 * | 3/2003 | Shih et al. .................... 89/36.02 |
| 6,544,913 B2 | 4/2003 | Kim et al. |
| 6,554,225 B1 | 4/2003 | Anast et al. |
| 6,696,144 B2 | 2/2004 | Holowczak et al. |
| 6,843,525 B2 | 1/2005 | Preisler |
| 6,959,894 B2 | 11/2005 | Hayashi |
| 7,069,836 B1 | 7/2006 | Palicka et al. |
| 7,077,306 B2 * | 7/2006 | Palicka et al. ................. 228/170 |
| 7,100,885 B2 | 9/2006 | Zerner |
| 7,104,177 B1 | 9/2006 | Aghajanian et al. |
| 7,124,982 B2 | 10/2006 | Brofeldt |
| 7,685,921 B2 * | 3/2010 | Dagher et al. ............... 89/36.02 |
| 2007/0116939 A1 * | 5/2007 | Benitsch et al. ........... 428/292.1 |

OTHER PUBLICATIONS

D.H. Laananen and K.L. Winkelman, "Analysis of energy-absorbing seat configurations for aircraft," IJCrash 1996 vol. 1 No. 4, p. 355-367.

X. Zhang, L. Hounslow, M. Grassi, "Improvement of Low-Velocity Impact and Compression-After-Impact Performance by Z-Fibre Pinning," Composites Science and Technology, 66 92006); 2785-2794.

A. Marasco, D. Cartie, I. Patridge, A. Rezai, "Mechanical Properties Balance in Novel Z-pinned Sandwich Panels: out-of-plane properties," Composites Part A—revision Mar. 2005.

A. Marasco, D. Cartie, I. Partridge, "Mechanical Properties Balance in Novel Z-pinned Sandwich Panels: Out-of-plane share," CompTest 2004, Bristol, Sep. 21-23, 2004.

* cited by examiner

STRUCTURAL PANEL WITH BALLISTIC PROTECTION

The present application is a Continuation-In-Part application of U.S. patent application Ser. No. 11/627,491, filed Jan. 26, 2007 now U.S. Pat. No. 8,709,584 (which claims the benefit of U.S. Provisional Patent Application No. 60/764,047, filed Jan. 31, 2006), and U.S. patent application Ser. No. 11/682,390, filed Mar. 6, 2007 (which claims the benefit of U.S. Provisional Patent Application No. 60/794,276, filed Apr. 20, 2006).

BACKGROUND OF THE INVENTION

The present invention relates to an armor system, and more particularly to a lightweight armor panel system which is integrated into an airframe as load bearing structure.

Conventional armor systems for aircraft are often a type of appliqué armor in which parasitic armor, such as steel plates are placed over existing aircraft structure in critical areas so as to defeat small arms fire. Although effective, these parasitic solutions may result in added weight which may reduces mission capabilities.

Accordingly, it is desirable to provide a lightweight armor system which is integrated into an airframe as load bearing structure to minimize effect on mission capabilities.

SUMMARY OF THE INVENTION

The armor system according to the present invention provides an integrated solution wherein the ballistic armor protection forms part of a load bearing structure such as an armored floor panel. With the integration of armored panels into the aircraft's structure, ballistic protection of the occupants and crew is provided while the total weight of the armor-structure system is reduced.

Each armored panel is manufactured as a sandwich structure having a multiple of layers. The armored panel generally includes a front face layer, a hard ballistic material layer, a compressed oriented fiber spall shield layer, a spacer layer, and a backing layer. The front face layer and the backing layer are manufactured from a polymer matrix composite glass fabric laid up in a multiple of plies. The backing layer stiffens the compressed oriented fiber spall shield layer to reduce deflection in response to projectile impact. The front face layer and the backing layer encapsulate the inner layers protect the inner layers from potential damage caused by environmental factors. The hard ballistic material layer is a Ceramic/CMC hybrid armor material. The compressed oriented fiber spall shield layer limits crack propagation, reduces the damage area of the hard ballistic material layer through dispersion of the projectile impact load and traps projectile and ceramic fragments. The spacer layer increases the panel depth and facilitates the integration of floor pans, cargo tiedowns and other preformed components which may then be recessed mounted within the armored floor panel.

The hard ballistic material layer includes a Ceramic Matrix Composite (CMC) layer bonded to a monolithic ceramic layer to form what is referred to herein as a Ceramic/CMC hybrid layer. The near perfect thermal expansion match between the CMC layer and the monolithic ceramic layer ensures that any pre-straining of the materials is minimized. The CMC layer(s) are continuously bonded to the monolithic ceramic layer. The high modulus CMC layer allows the compressive stress wave from projectile impact to easily move from the monolithic ceramic layer hard face through to the CMC layer thereby effectively increasing the armor protection. A front face CMC layer confines the monolithic ceramic layer and focuses the ejecta plume of ceramic material pulverized by the projectile impact directly back at the projectile. A back face CMC layer reinforces the back surface of the monolithic ceramic layer where the compressive stress wave reflects as a tensile stress wave. The CMC layer(s) further facilitates energy absorption from projectile impact through fiber debonding and pullout, as well as shear failure.

The lightweight armor system is capable of defeating Armor Piercing (AP) rounds which have very hard metal inserts. More preferably, the lightweight armor system is capable of defeating a 7.62 mm×54R API projectile at 100 meters or more, and a 12.7×109 mm API projectile at 500 meters or more. The ballistic armor protection is readily scalable to defeat more or less energetic rounds by adjusting the thickness of the CMC layer and ceramic layer.

The present invention therefore provides a lightweight armor system which is readily integrated into an airframe as load bearing structure to minimize effect on mission capabilities.

BRIEF DESCRIPTION OF THE DRAWINGS

The various features and advantages of this invention will become apparent to those skilled in the art from the following detailed description of the currently disclosed embodiment. The drawings that accompany the detailed description can be briefly described as follows.

DETAILED DESCRIPTION OF THE DISCLOSED EMBODIMENT

Figure 1A:
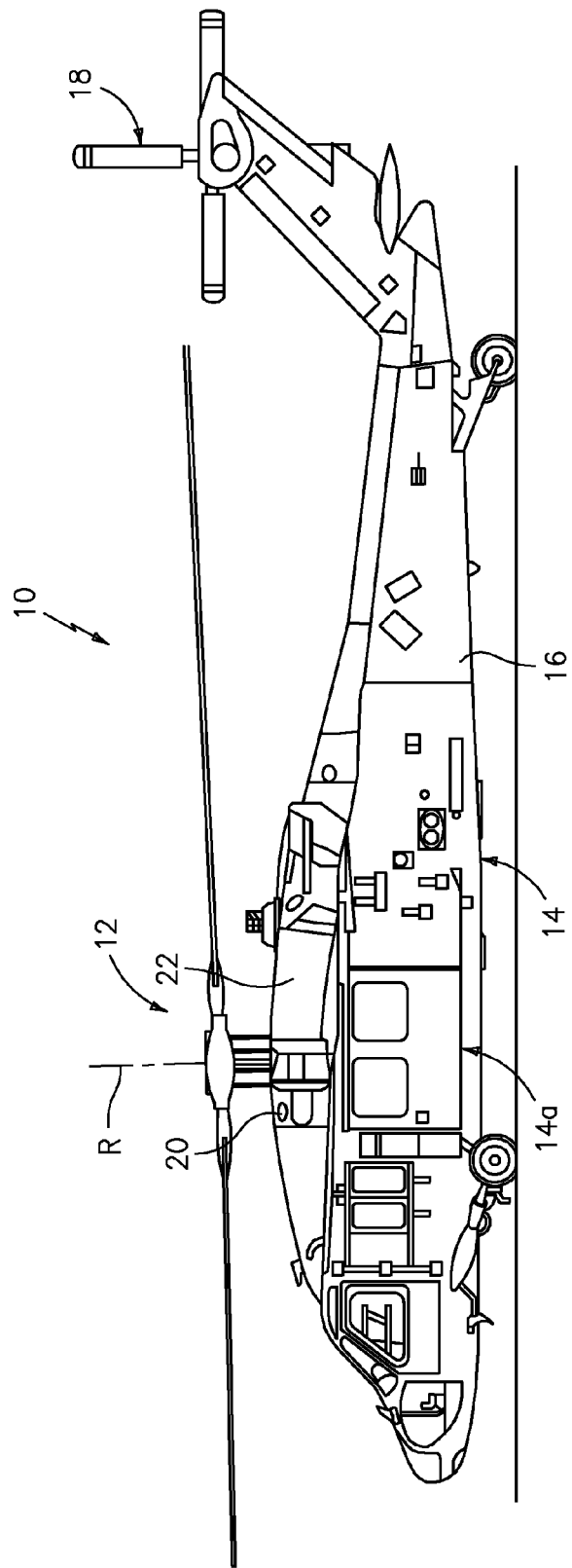
FIG. 1A is a general side perspective view of an exemplary rotary wing aircraft embodiment for use with the present invention.

FIG. 1A schematically illustrates a rotary-wing aircraft 10 having a main rotor system 12. The aircraft 10 includes an airframe 14 having an extending tail 16 which mounts a tail rotor system 18, such as an anti-torque system. The airframe 14 includes an armored airframe section 14A. It should be understood that any airframe section may include armored panels as described below. The main rotor assembly 12 is driven about an axis of rotation R through a main gearbox (illustrated schematically at 20) by one or more engines 22. The main rotor system 12 includes a multiple of rotor blades mounted to a rotor hub. Although a particular helicopter configuration is illustrated and described in the disclosed embodiment, other configurations and/or machines, such as high speed compound rotary wing aircraft with supplemental translational thrust systems, dual contra-rotating, coaxial rotor system aircraft, turbo-props, tilt-rotors and tilt-wing aircraft, will also benefit from the present invention.

Figure 1B:
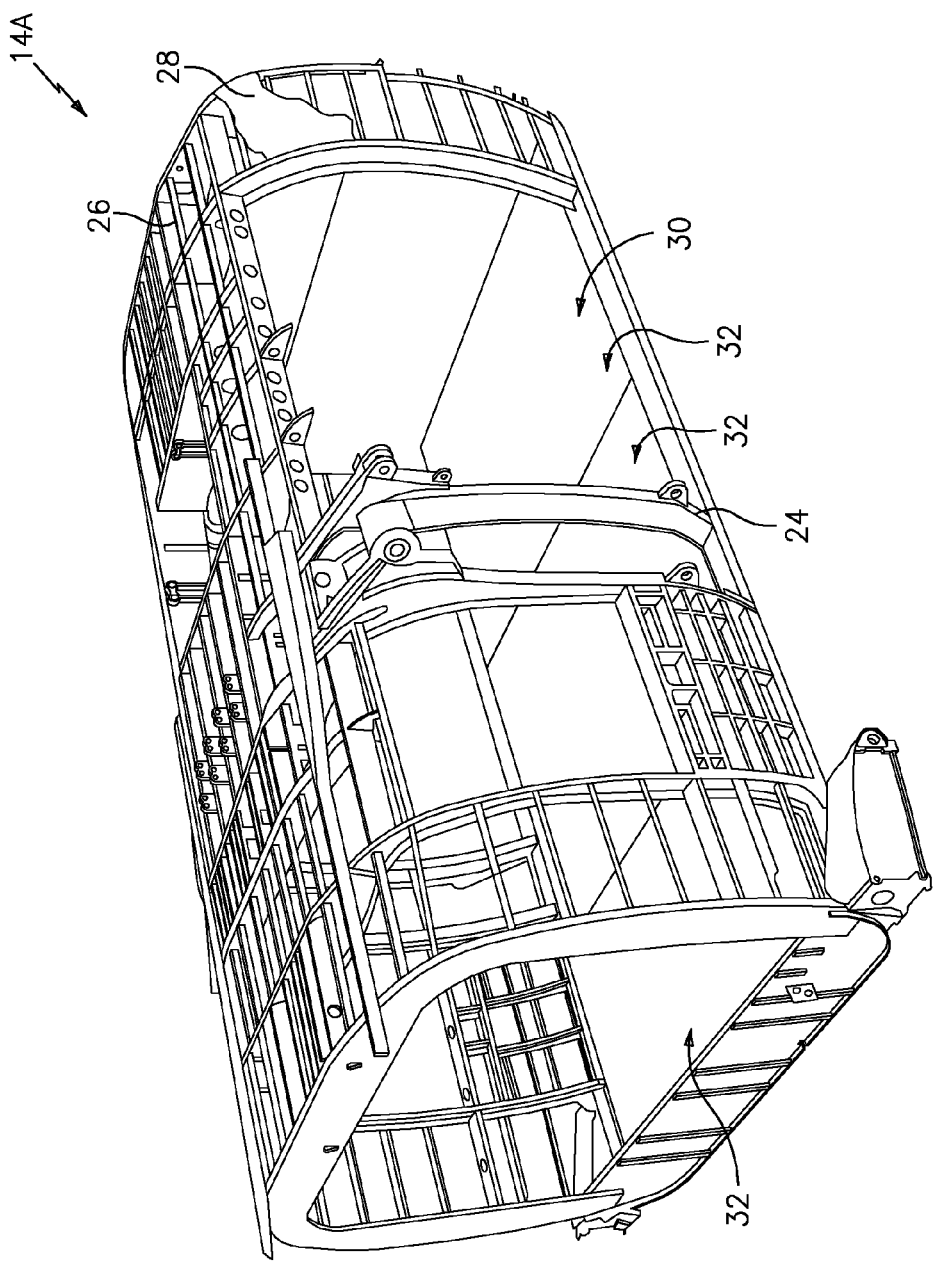
FIG. 1B is a perspective side view of an airframe section of the rotary wing aircraft of FIG. 1A with an outer skin removed illustrating an armored floor system mounted therein.

Referring to FIG. 1B, the airframe section 14A, here illustrated as a cabin section, which may include, inter alia, a multitude of frame members 24 and a multitude of beam members 26 which support an aircraft outer skin 28 and a floor system 30 (FIG. 2) formed of a multiple of armored panels 32. The multitude of frame members 24 and beam members 26 are arranged in a generally rectilinear pattern, however, any arrangement may be provided.

The armor system according to the present invention provides an integrated solution wherein the armor protection is integrated into load bearing structure to provide ballistic protection and a more optimized lightweight solution to maximize mission capability. It should be understood that armored panels 32 for a rotary-wing aircraft are described only for illustrative purposes in the disclosed embodiment and that various armored panels including appliqué armor, wall panels, seat panels, housing structures and the like will also benefit from the present invention. With the integration of armor into the load bearing structure itself, ballistic protection of the occupants and crew is provided while the total weight of the integrated armor-structure system is reduced as compared to parasitic armor systems. The weight reduction over current parasitic armor systems effectively increases the payload and range of the intended mission.

Figure 2A:
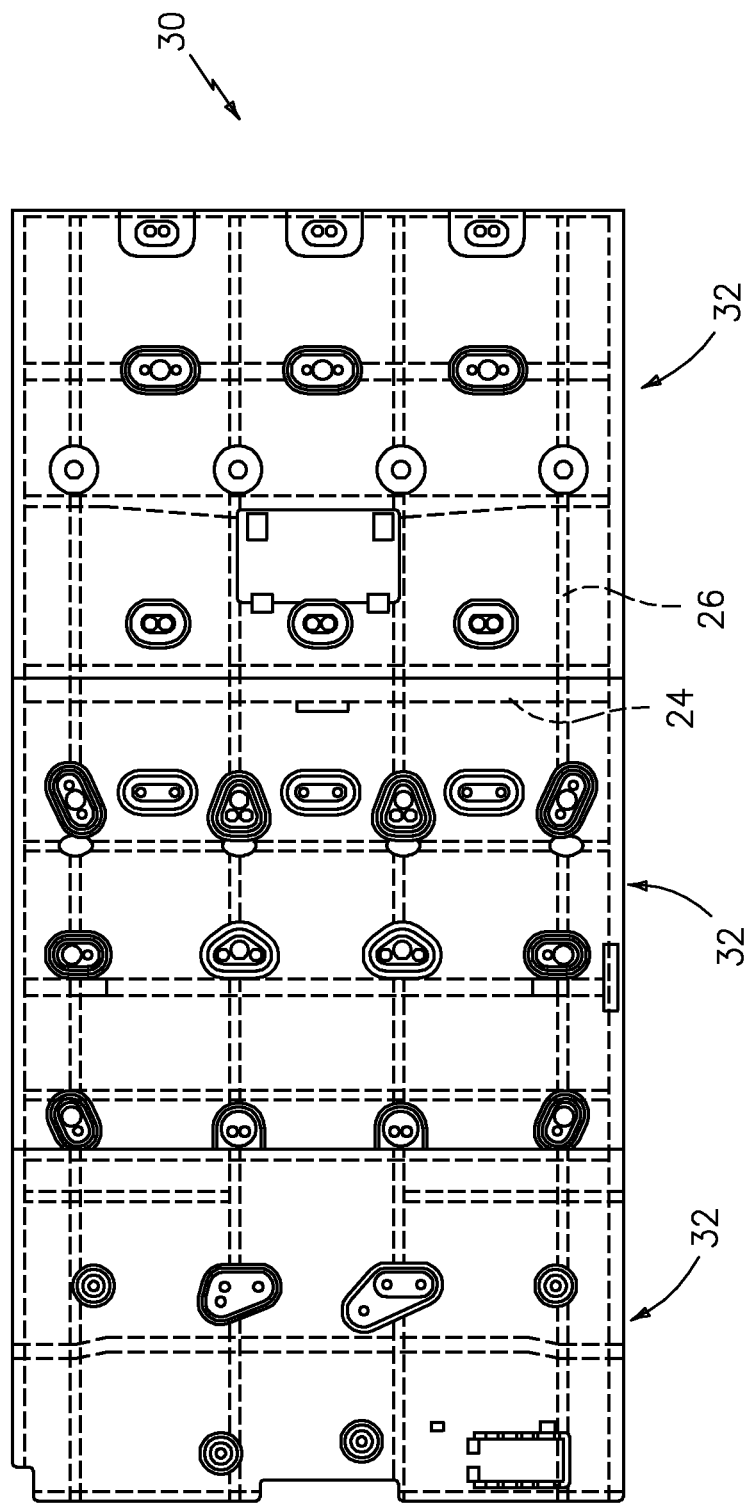
FIG. 2A is a top view of an armored floor system.
Figure 2B:
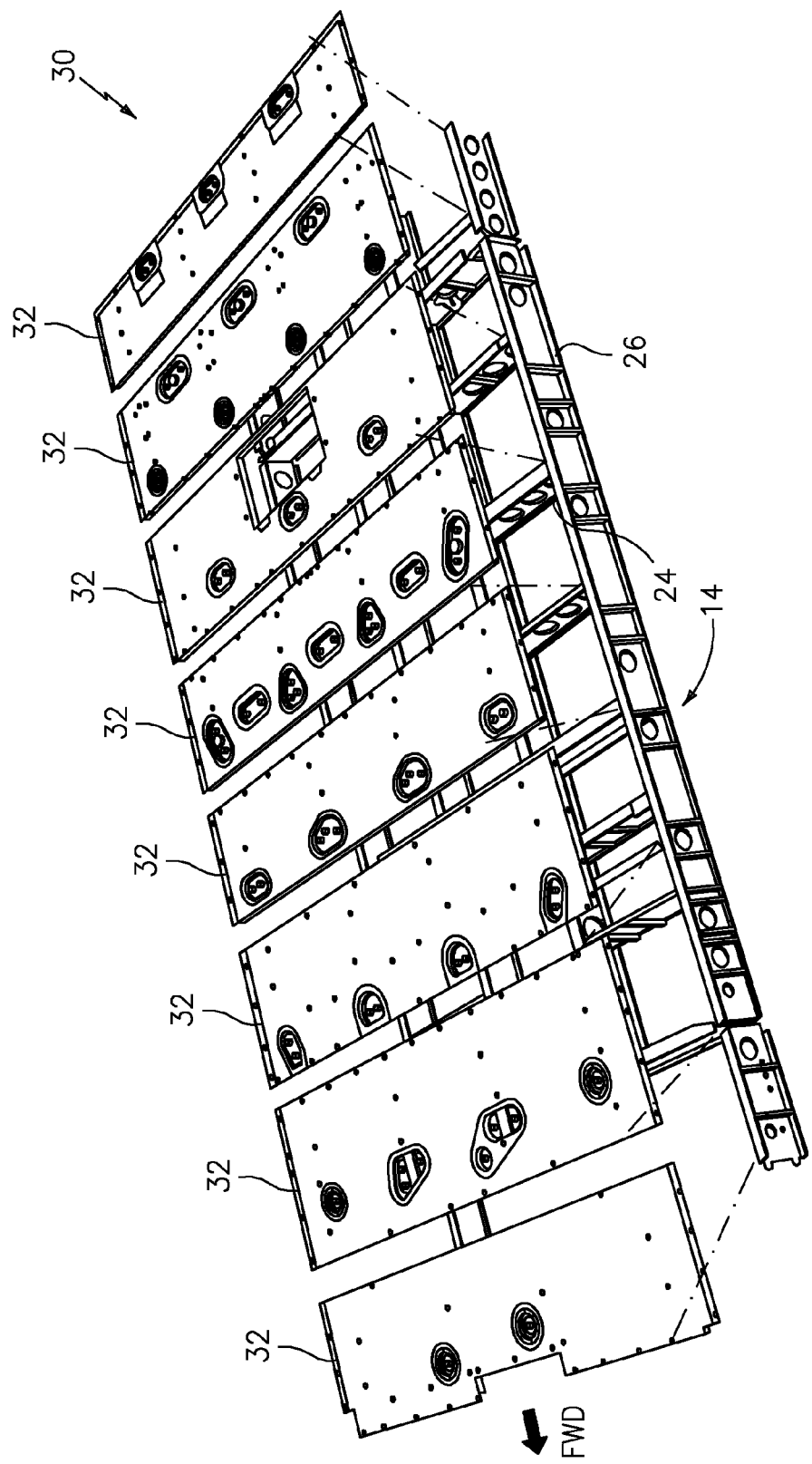
FIG. 2B is an exploded perspective view of the armored floor panel.
Figure 3A:
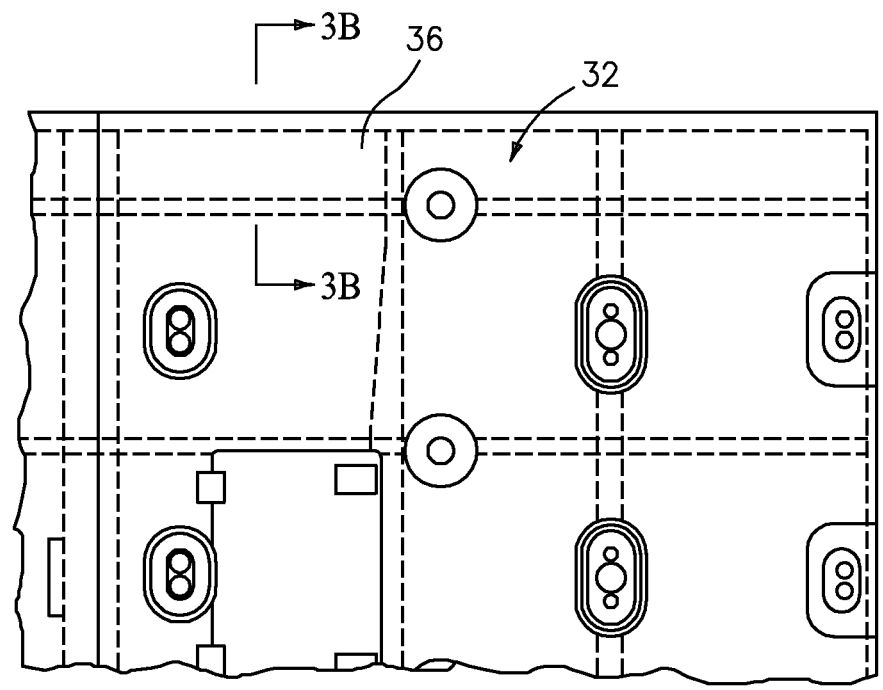
FIG. 3A is an expanded top view of an armored floor panel.
Figure 3B:
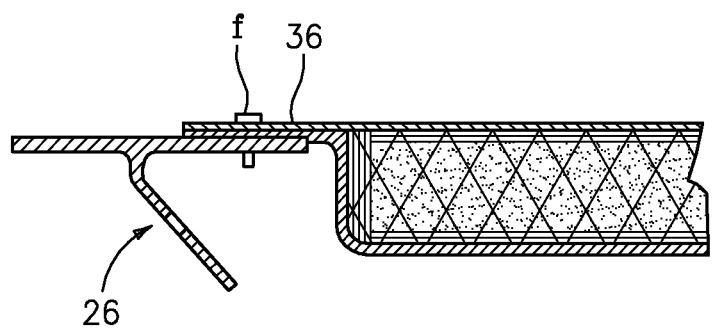
FIG. 3B is a sectional view of the armored floor panel taken along line 3B-3B of FIG. 3A illustrating a flanged edge thereof.

Referring to FIG. 2A, the floor system 30 may be fabricated from individual armored panels 32 that are, for example, mechanically attached to the airframe 14 (FIG. 2B). The armored panels 32 are attached to the lower tub structural frame members 24 and beam members 26 through fasteners f which are located through a flange edge structure 36 (FIGS. 3A and 3B) of each floor panel. The flange edge structure 36 need only retain the panel 32 to the airframe section 14A as the armored panel 32 is supported upon the frame members 24 and beam members 26. This installation arrangement facilitates the rapid repair and/or replacement of armored panels 32 with minimal effect on the ballistic protection. Alternatively, the floor system 30 can be designed and manufactured as a single unit.

Figure 4A:
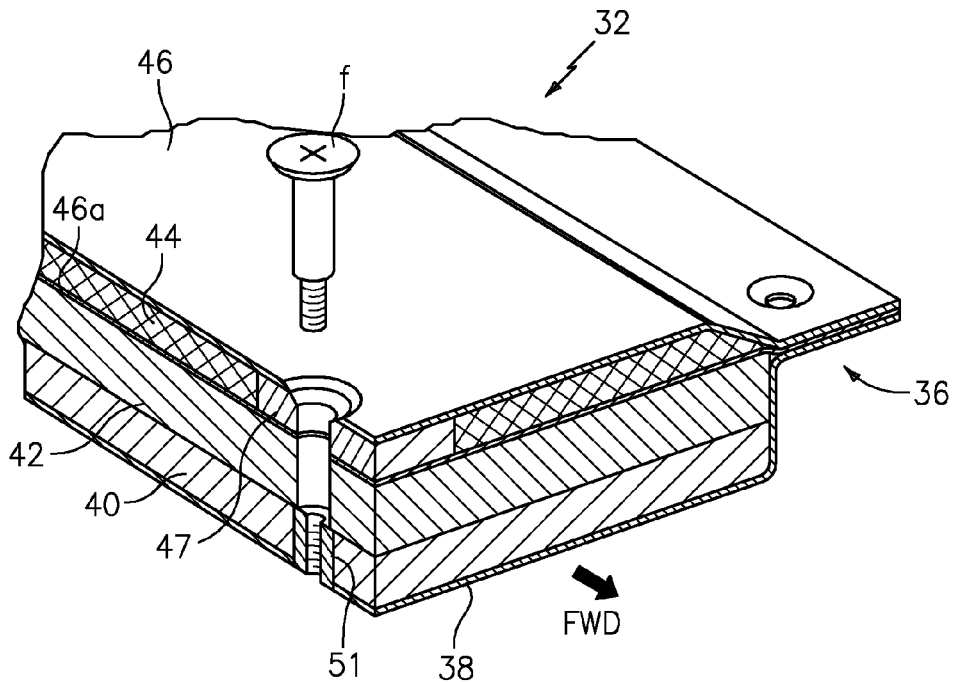
FIG. 4A is a sectional view of an armored panel illustrating the multiple of layers therein.

Referring to FIG. 4A, each armored panel 32 is manufactured as a sandwich structure having a multiple of layers bonded together. The armored panel 32 generally includes a front face layer 38, a hard ballistic resistant material layer 40, a compressed oriented fiber spall shield layer 42, a spacer layer 44 and a backing layer 46. It should be understood that various conventional methods may be utilized to bond each layer to the adjacent layer and that various thicknesses of each layer may be utilized with the present invention. In one disclosed embodiment, the front face layer 38 is approximately 0.02 inches thick, the hard ballistic resistant material layer 40 is approximately 0.35 inches thick, the compressed oriented fiber spall shield layer 42 is approximately 0.5 inches thick, the spacer layer 44 is approximately 0.22 inches thick, and the backing layer 46 is approximately 0.09 inches thick.

The front face layer 38, the backing layer 46 and an intermediate layer 46A are manufactured from a polymer matrix composite glass fabric cloth such as fiberglass, S-2 Glass, IM Graphite, Low Mod Graphite, Kevlar or the like which is laid up in a multiple of plies as generally understood. In the disclosed embodiment, zero to three plies are utilized to form the front face layer 38 and from four to ten plies are utilized to form the backing layer 46. The backing layer 46 is of increased thickness primarily to provide a wear resistant floor surface as well as to stiffen the compressed oriented fiber spall shield layer 42 to reduce deflection in response to a projectile impact. It should be understood that for a non-floor armored panel, other numbers of plies may be utilized.

Figure 4B:
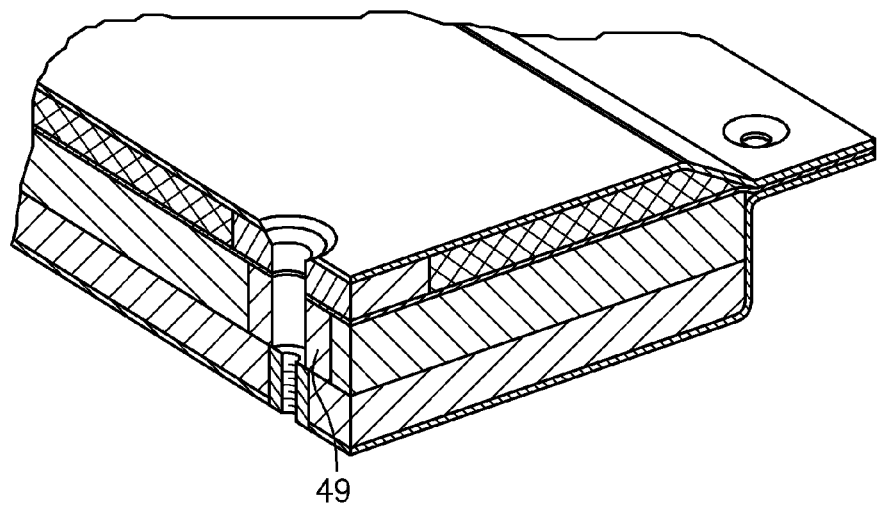
FIG. 4B is a sectional view of another armored panel illustrating the multiple of layers therein.
Figure 5:
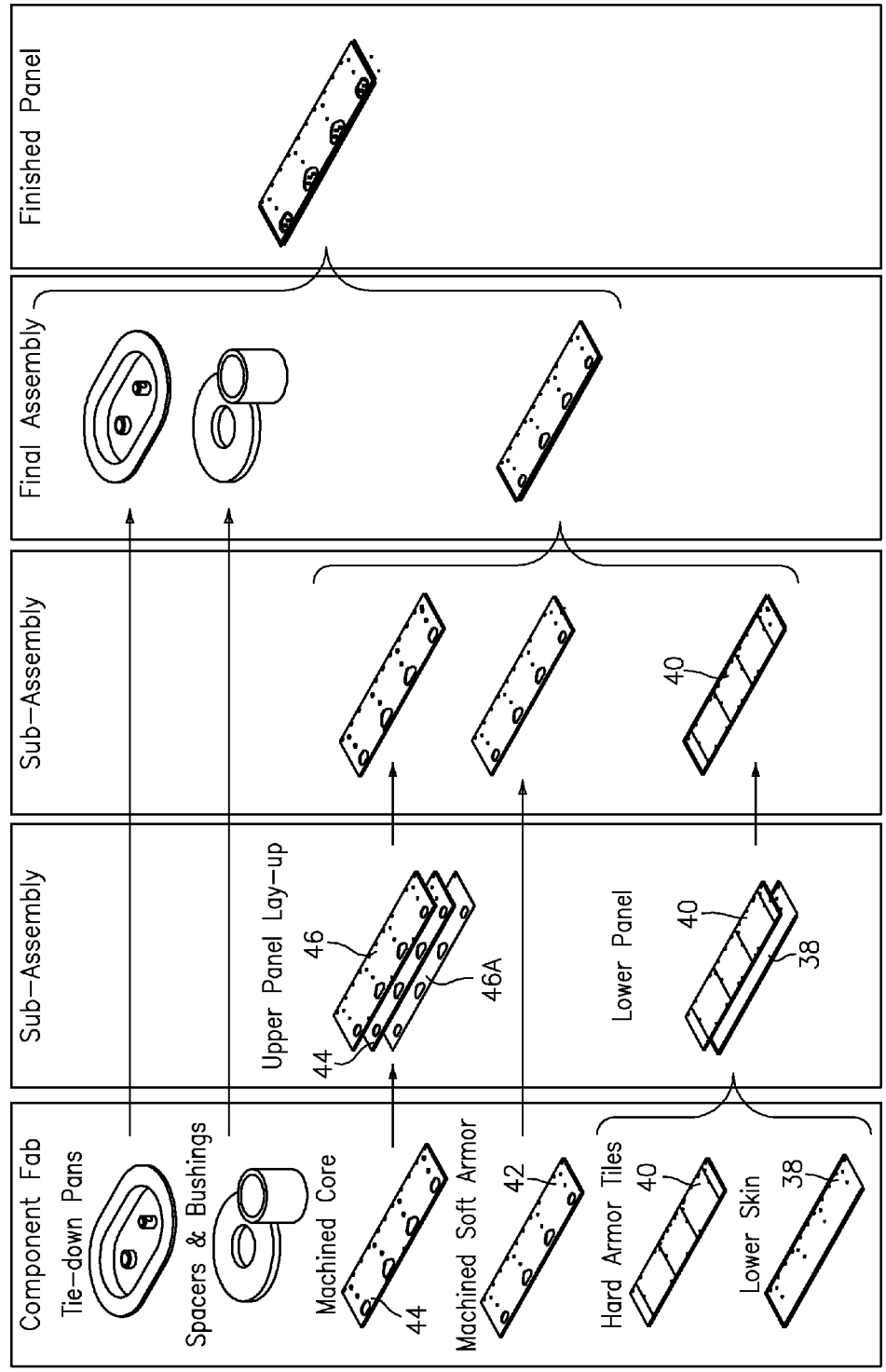
FIG. 5 is a basic manufacturing sequence of the armored panel.

The intermediate layer 46A is bonded to the spacer layer 44 to enclose the spacer layer 44 between the backing layer 46 and intermediate layer 46A. The intermediate layer 46A further retains compression blocks 47 and other such molded inserts between the backing layer 46 and intermediate layer as necessitated by the floor configuration assembly (FIG. 5). Other compression plugs 49 (FIG. 4B) may alternatively or additionally be located within the compressed oriented fiber spall shield layer 42 to facilitate manufacture with the low compression strength material typical of the compressed oriented fiber spall shield layer 42.

Figure 4C:
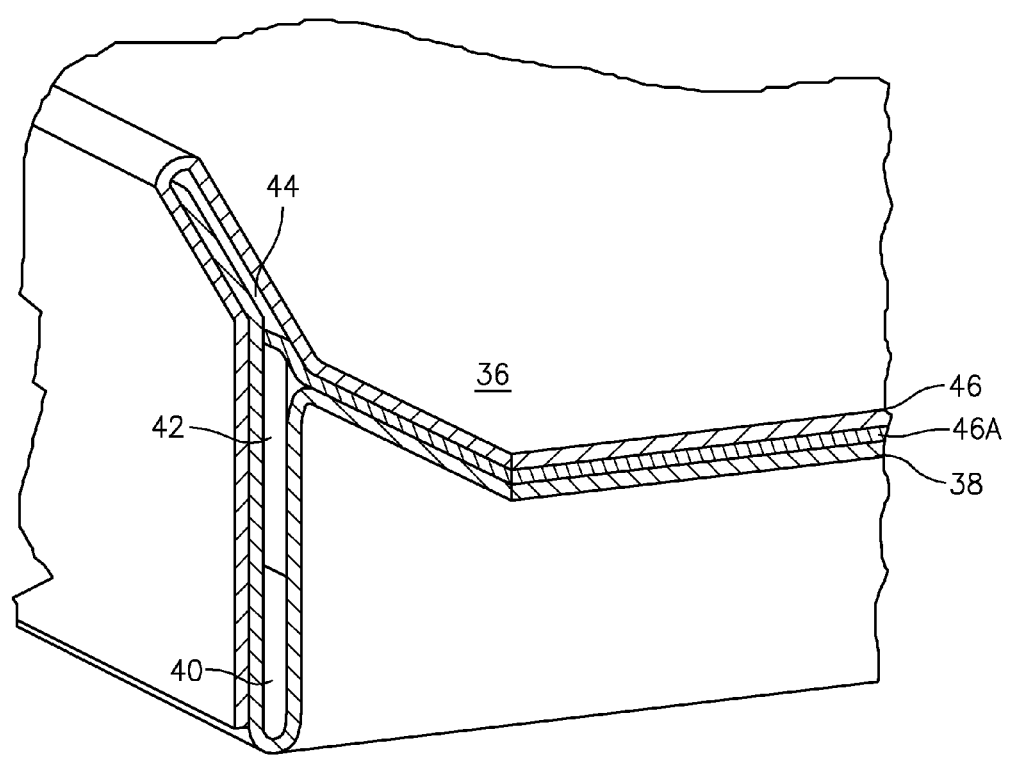
FIG. 4C is a perspective view of the armored panel illustrating a corner edge view adjacent a flanged edge thereof.

The front face layer 38, although potentially being absent, includes at least one ply in the disclosed embodiment such that the front face layer 38 and the backing layer 46 encapsulate the inner layers 40-44 and form the flange edge structure 36. Such encapsulation further protects the inner layers 40-44 from potential damage caused by environmental factors. Overlapping of the front face layer 38 and the backing layer 46 create forward and aft closeouts (FIG. 4C). That is, forward and aft edge closeouts are provided as the longitudinal edge includes the flange edge structure 36. It should be understood that various edge structures which may or may not form gaps may be utilized depending upon the type of panel. Any gaps may be readily sealed by caulk or the like.

The hard ballistic resistant material layer 40 may be a metal alloy such as titanium but is preferably a Ceramic/CMC hybrid armor material as will be more fully described below. Generally, ceramic materials provide increased ballistic protection at a lower density as compared to metal alloys but may be more expensive to manufacture. Nylon bushings 51 or the like may be utilized within the hard ballistic resistant material layer 40 to receive fasteners f or the like which may not be threaded directly thereto. That is, the fastener f threads into or through the nylon bushing 51 as the hard ballistic resistant material layer 40 is typically not conducive to receipt of a threaded surface.

The compressed oriented fiber spall shield layer 42 is a Dyneema®, Spectra®, Kevlar® or other such material which provides polyethylene fibers that offer significant strength combined with minimum weight. The compressed oriented fiber spall shield layer 42 limits crack propagation and reduces the damage area of the hard ballistic resistant material layer 40 through dispersion of projectile impact load. The compressed oriented fiber spall shield layer 42 also traps projectile and ceramic fragments.

Figure 6A:
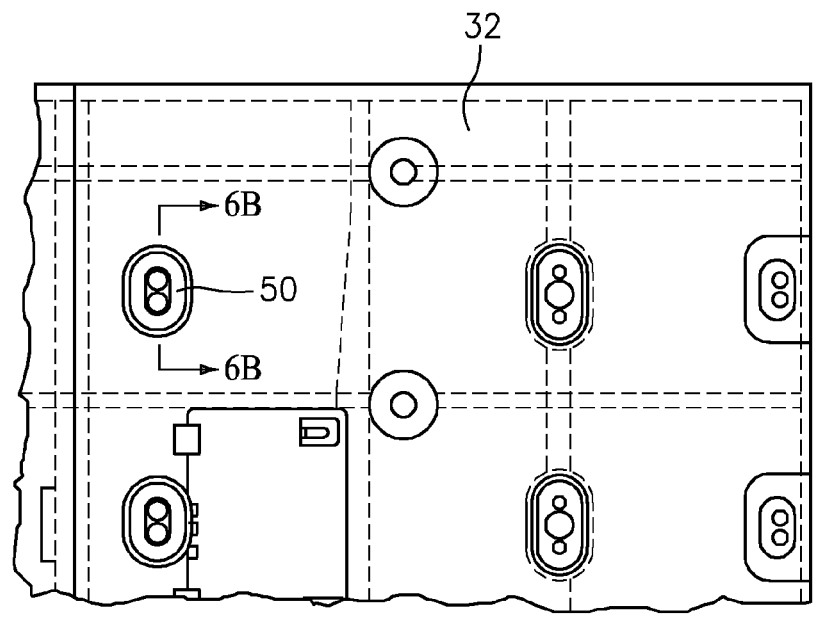
FIG. 6A is an expanded top view of an armored floor panel.
Figure 6B:
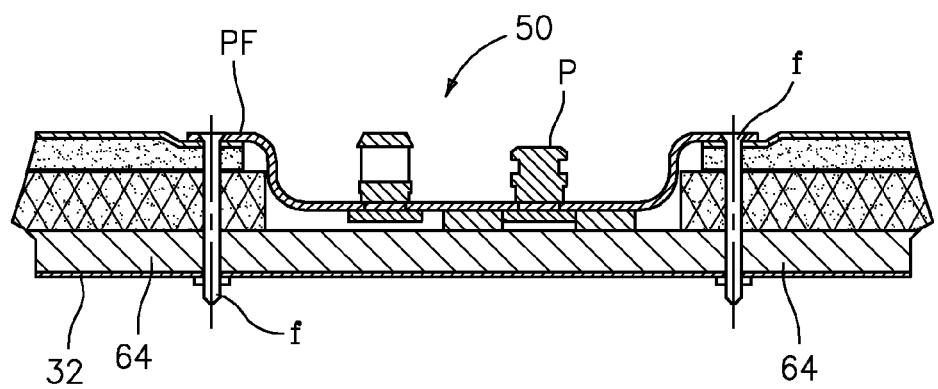
FIG. 6B is a sectional view of the armored floor panel taken along line 6B-6B of FIG. 6A.
Figure 7A:
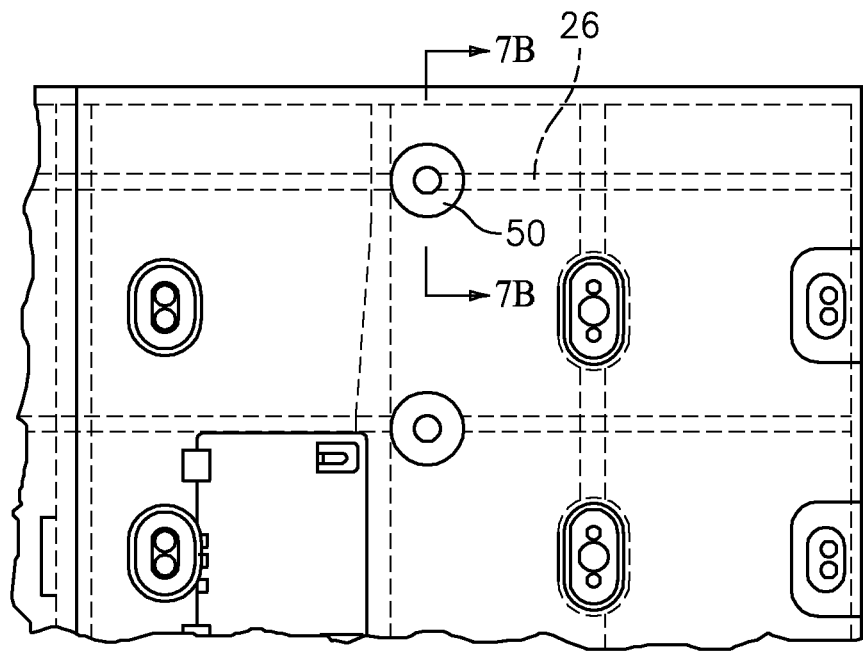
FIG. 7A is an expanded top view of an armored floor panel.
Figure 7B:
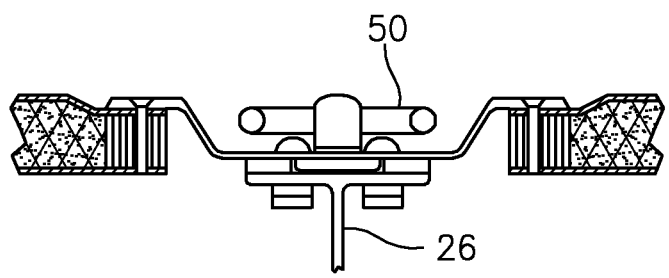
FIG. 7B is a sectional view of the armored floor panel taken along line 7B-7B of FIG. 7A.
Figure 7C:
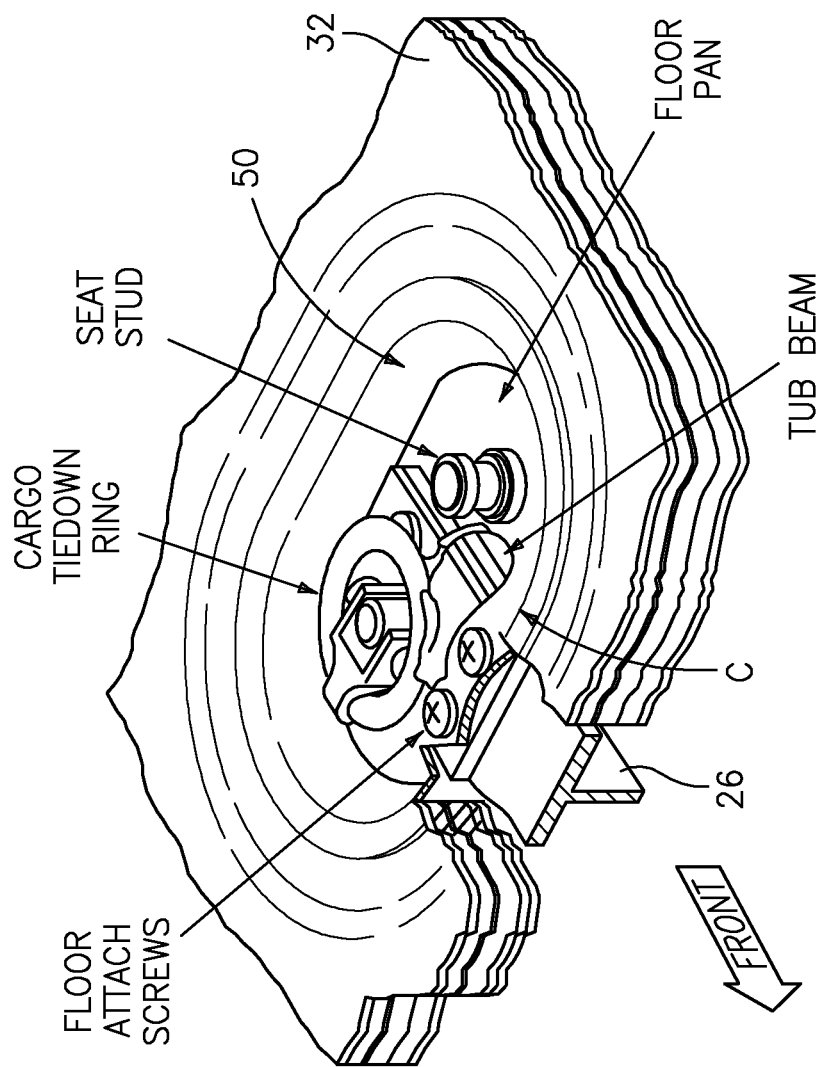
FIG. 7C is a perspective partial fragmentary view of a cargo tie down ring recessed within an armored floor panel according to the present invention.
Figure 7D:
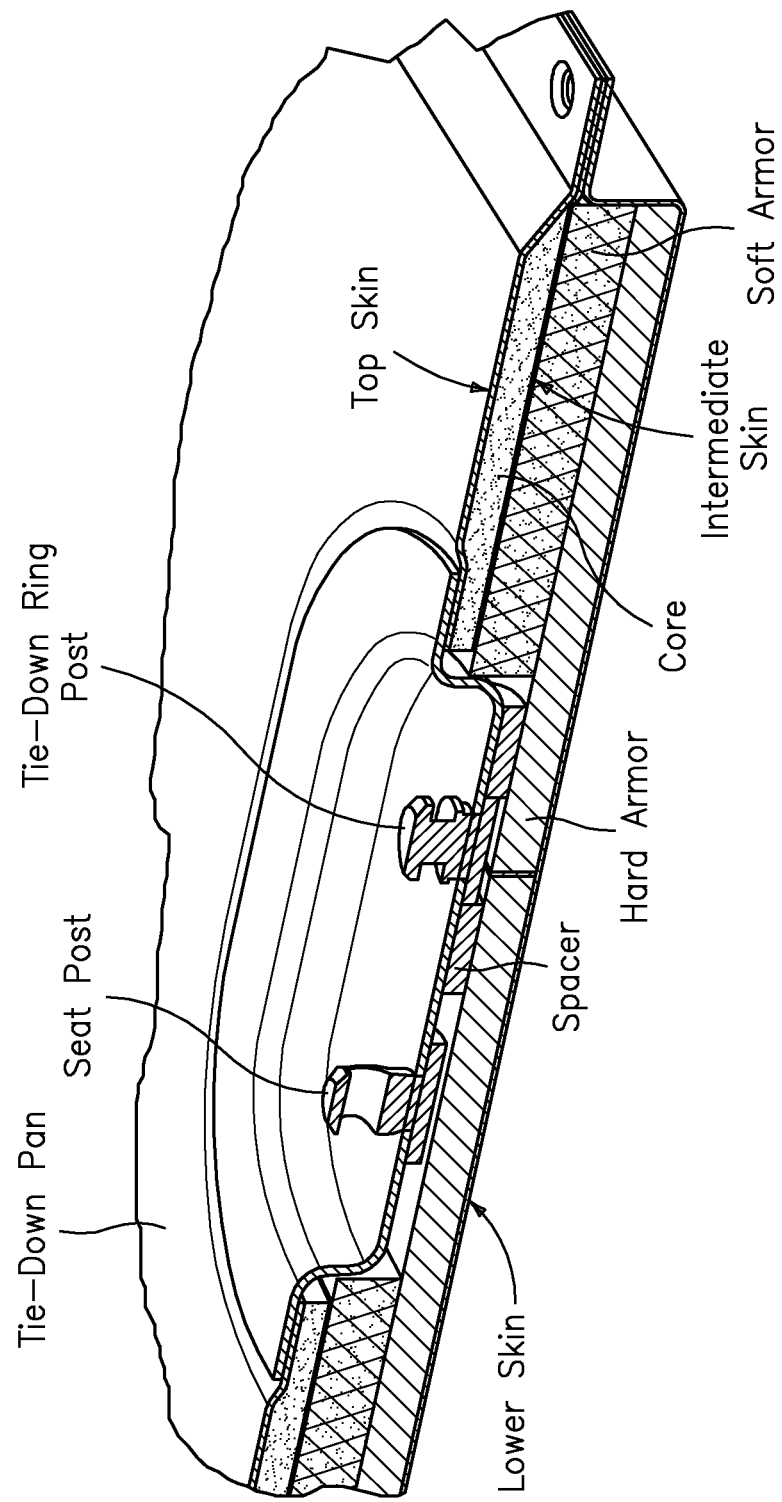
FIG. 7D is a sectional view through the armored floor panel and a preformed component.
Figure 8A:
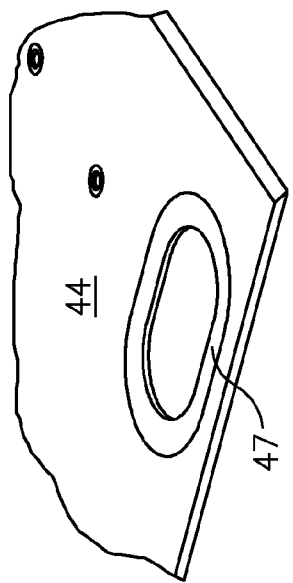
FIG. 8A is a perspective view of a spacer layer of the armored panel illustrating a molded insert.
Figure 8B:
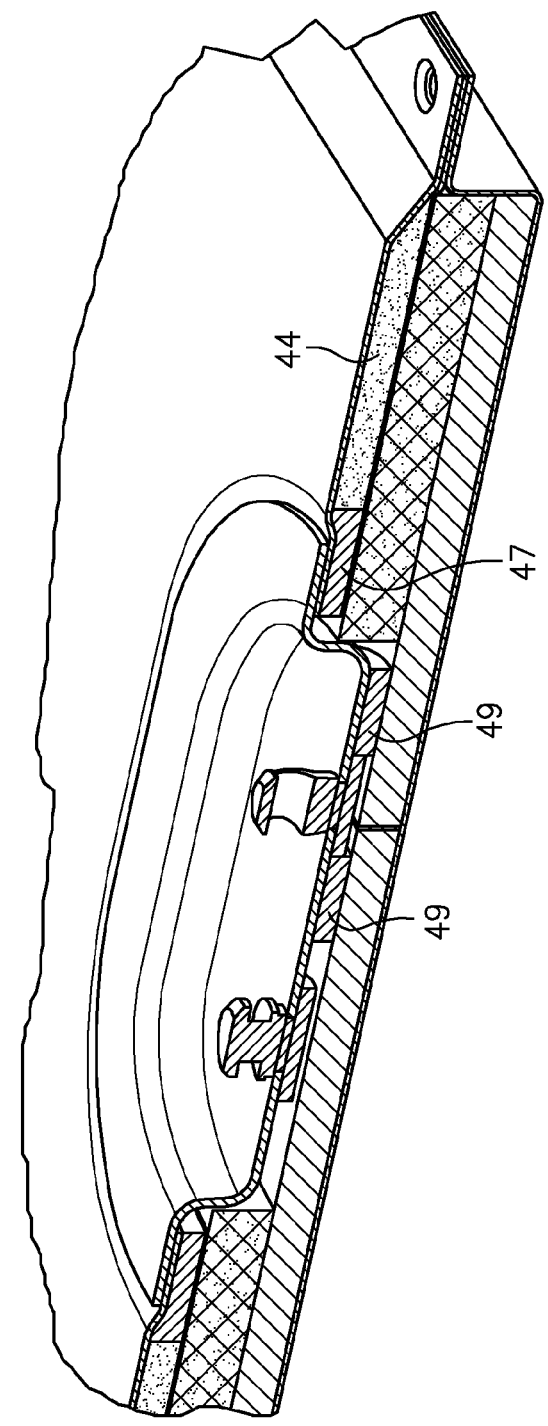
FIG. 8B is a sectional view of the armored panel illustrated in FIG. 8A.

The spacer layer 44 is a Nomex honeycomb core, a K-Cor™, or X-Cor™ material manufactured by Albany Engineered Composites of Mansfield, Mass. USA which increases the floor panel 32 depth to facilitate installation of seat floor pans, cargo tie-down pans 50 and other preformed components in both an open bay (FIGS. 6A and 6B) and over a beam member 26 (FIGS. 7A-7D) location. That is, the spacer layer 44 provides a receipt area depth for preformed components typical of aircraft floors for recess mounting within the armored panel 32 without loss of armored protection in that area. Alternatively, or in addition thereto, other molded inserts 47 (FIG. 8A) may be utilized within the spacer layer 44 to minimize machining requirements or thin areas of the spacer layer 44 (FIG. 8B).

Figure 9:
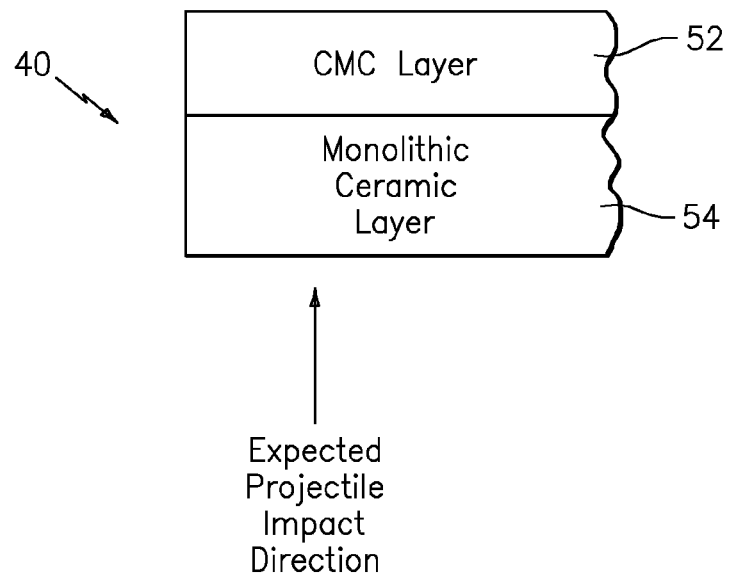
FIG. 9 is a sectional view of one embodiment of the hard ballistic material layer of the armored panel illustrated in FIG. 4.
Figure 10:
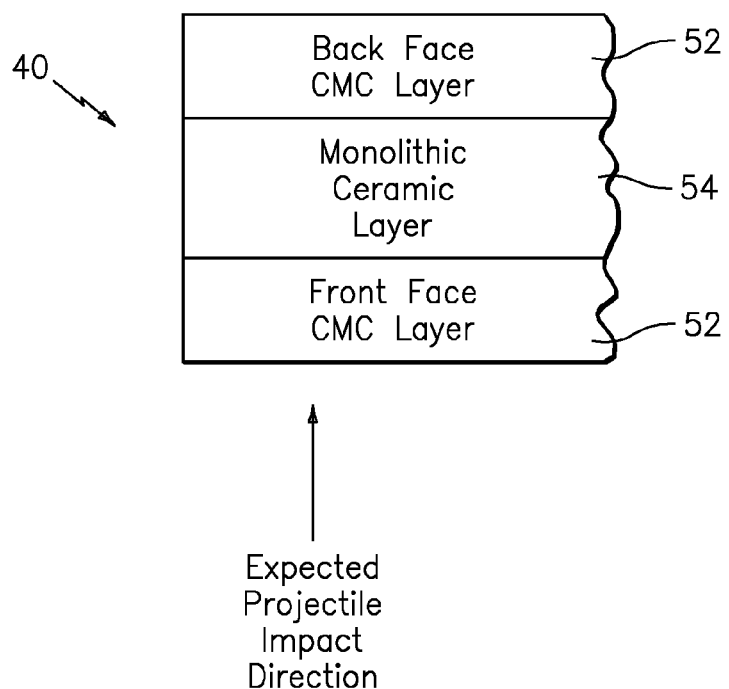
FIG. 10 is a sectional view of another embodiment of the hard ballistic material layer of the armored panel illustrated in FIG. 4.

Referring to FIG. 9, the hard ballistic resistant material layer 40 includes a Ceramic Matrix Composite (CMC) layer 52 bonded to a monolithic ceramic layer 54. The hard ballistic resistant material layer 40 is also referred to herein as a Ceramic/CMC hybrid layer. The Ceramic Matrix Composite (CMC) layer 52 may alternatively be bonded to both a front face and a rear face of the monolithic ceramic layer 54 (FIG. 10). It should be understood that the terms "front face" and "rear face" are with reference to a direction from which a projectile is expected to strike. The Ceramic/CMC hybrid armor in the disclosed embodiment includes the CMC layer 52 continuously bonded to the monolithic ceramic layer 54.

The monolithic ceramic layer 54 may be, for example only, silicon nitride ($Si_3N_4$), silicon aluminum oxynitride (SiAlON), silicon carbide (SiC), silicon oxynitride ($Si_2N_2O$), aluminum nitride (AlN), aluminum oxide ($Al_2O_3$) hafnium oxide ($HfO_2$), zirconia ($ZrO_2$), siliconized silicon carbide (Si—SiC) or a combination thereof. It shall be understood that other oxides, carbides or nitrides may also be capable of withstanding such elevated temperatures.

The CMC layer 52 generally includes a glass-ceramic matrix composite having a matrix and fiber reinforcement. The matrix typically includes a silicate capable of being crystallized. Examples of such silicates may include magnesium aluminum silicate, magnesium barium aluminum silicate, lithium aluminum silicate and barium aluminum silicate. The glass-ceramic matrix composite reinforcement typically includes a ceramic fiber capable of high tensile strength and elevated temperature creep resistance. Examples of such ceramic fibers comprise silicon carbide (SiC), silicon nitride ($Si_3N_4$) aluminum oxide ($Al_2O_3$), silicon aluminum oxynitride (SiAlON), aluminum nitride (AlN) and combinations thereof. The CMC layer 52 most preferably includes carbon coated silicon carbide fibers (Nicalon™) in an 8 harness satin weave, with a barium magnesium aluminum silicate "BMAS" matrix material which also operates as an adhesive between the CMC layer 52 and the monolithic ceramic layer 54 to provide the continuous bond therebetween.

The CMC layer 52 may be continuously bonded to the monolithic ceramic layer 54 by infiltrating a ceramic fiber mat or preform with either a matrix material or a matrix precursor. Specifically, such methods may include, (1) infiltrating a glass into a ceramic fiber mat or preform, which contacts the monolithic ceramic layer 54; (2) creating the matrix of CMC layer 52 by a chemical vapor infiltrated process while the CMC layer 52 is in contact with the monolithic ceramic layer 54; (3) forming the matrix of a CMC layer 52 by a polymer infiltration and pyrolysis process while a fibrous mat or preform contacts the monolithic ceramic layer 54; and (4) fabricating the CMC layer 52 and epoxy bonding the CMC layer 52 to the ceramic layer 54.

For further understanding of affixing the CMC layer 52 to the monolithic ceramic layer, attention is directed to U.S. Pat. No. 6,696,144 which is assigned to the assignee of the instant invention and which is hereby incorporated herein in its entirety.

The near perfect thermal expansion match between the CMC layer 52 and the monolithic ceramic layer 54 face insures that any pre-straining of the materials is minimized. The high elastic modulus of the BMAS matrix, when compared to a typical polymer (e.g. epoxy) matrix, results in highly efficient transfer of incoming ballistic induced strain waves to the fiber matrix interfaces. The elastic modulus (stiffness) of the CMC layer 52 backing has a direct influence on the performance of the monolithic ceramic layer 54 and thus the armor panel 32 in total. That is, the higher the elastic modulus of the CMC layer 52, the more readily the CMC layer 54 will absorb some fraction of the project impact energy thereby resulting in an effective increase in the armor protection. Furthermore, the carbon coated Nicalon in the BMAS matrix readily debinds and the slip of the fibers through the matrix produces a Ceramic/CMC hybrid armor with high work of fracture to effectively absorb energy from the ballistic impact.

The high modulus CMC layer 52 (compared to conventional polymer matrix composites) allow the compressive stress wave from projectile impact to easily move from the monolithic ceramic layer 54 through to the CMC layer 52 of the Ceramic/CMC hybrid armor. The front face CMC layer (FIG. 8) confines the monolithic ceramic layer 52 and focuses the ejecta plume of ceramic material pulverized by the projectile impact directly back at the projectile. The back face CMC layer 52 reinforces the back surface of the monolithic ceramic layer 54 where the compressive stress wave reflects as a tensile stress wave. The CMC layer 54 facilitates energy absorption from a projectile impact through fiber debonding and pullout, as well as shear failure.

Applicant has determined with testing performed using hardened steel balls fired at samples over a range of velocities and with modeling of the energy absorbed that the CMC layer 52 is much more efficient than a conventional titanium backing layer in absorbing impact energy. In addition, damage even at AP bullet velocities was highly localized such that Ceramic/CMC hybrid armor panels are effective against multiple ballistic impact situations.

Figure 11:
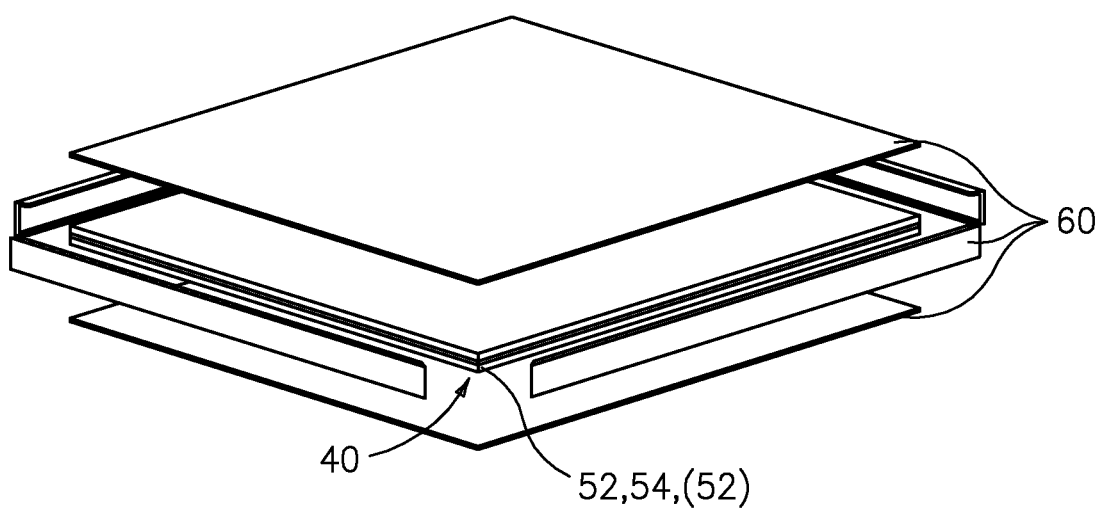
FIG. 11 is an exploded perspective view of the hard ballistic material layer of the armored panel illustrated in FIG. 4 with a metallic alloy shell which encapsulates the hard ballistic material layer.

Referring to FIG. 11, the hard ballistic resistant material layer 40 may additionally be encapsulated within a metallic alloy shell 60 such as titanium, molybdenum, or other brazeable material. It should be understood that various metallic alloys may be utilized. The metallic alloy shell 60 increases ballistic protection provided by the hard ballistic resistant material layer 40 but increases the weight of the armor panel. The metallic alloy shell 60 is brazed at elevated temperatures then contracts more than the hard ballistic resistant material layer 40 such that the hard ballistic resistant material layer 40 is placed in a state of compression. The metallic alloy shell 60 further prevents the hard ballistic resistant material layer 40 from flowing in response to projectile impact which increases the effective harness thereof as well as the dwell time of the projectile to thereby provide a still more hardened armored panel 32.

The lightweight armor system is capable of defeating Armor Piercing (AP) rounds which have very hard metal inserts. Furthermore, the hard ballistic resistant material layer is readily scalable to defeat more or less energetic rounds by adjusting the thickness of the CMC layer and ceramic layers.

It should be appreciated that the armor system of the instant invention may be utilized in fixed wing aircraft, ground transportation vehicles, personal body armor, etc. and that various panel sizes, layer combinations and depth of layers may be utilized and specifically tailored to the desired element which is to be armor protected.

It should be understood that relative positional terms such as "forward," "aft," "upper," "lower," "above," "below," and the like are with reference to the normal operational attitude of the vehicle and should not be considered otherwise limiting.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An armored panel comprising:
   a front face layer;
   a monolithic ceramic layer adjacent to said front face layer;
   a rear face Ceramic Matrix Composite (CMC) layer continuously bonded to a rear face of said monolithic ceramic layer; and
   a backing layer adjacent to said rear face CMC layer, to at least partially encapsulate said monolithic ceramic layer and said rear face Ceramic Matrix Composite (CMC) layer between said front face layer and said backing layer.

2. The armor system as recited in claim 1, further comprising a front face CMC layer bonded to a front face of said monolithic ceramic layer.

3. The armor system as recited in claim 1, further comprising a compressed oriented fiber spall shield layer bonded to said rear face CMC layer.

4. The armor system as recited in claim 1, further comprising a metallic alloy shell which encapsulates said rear face CMC layer and said monolithic ceramic layer to place said layers in a state of compression.

5. The armor system as recited in claim 4, wherein said metallic alloy shell is a brazeable material.

6. The armor system as recited in claim 1, wherein said front face layer is adjacent said backing layer along at least one edge to form a flange edge structure.

7. The armor system as recited in claim 1, further comprising:
   a front face CMC layer bonded to a front face of said monolithic ceramic layer; and
   a compressed oriented fiber spall shield layer bonded to said rear face CMC layer bonded to rear face of said monolithic ceramic layer.

8. An armored panel comprising:
   a front face layer;
   a hard ballistic material layer adjacent to said front face layer;
   a compressed oriented fiber spall shield layer bonded to a rear face of said hard ballistic material layer; and
   a backing layer adjacent to said compressed oriented fiber spall shield layer to at least partially encapsulate said hard ballistic material layer and said compressed oriented fiber spall shield layer between said front face layer and said backing layer, said backing layer adjacent to said front face layer along at least one edge of the armored panel to form a flange edge structure.

9. The armored panel as recited in claim 8, wherein said backing layer and said front face layer at least partially encapsulate said hard ballistic material layer and said compressed oriented fiber spall shield layer.

10. The armored panel as recited in claim 8, further comprising a spacer layer intermediate said compressed oriented fiber spall shield layer and said backing layer.

11. The armored panel as recited in claim 10, further comprising an intermediate layer intermediate said spacer layer and said compressed oriented fiber spall shield layer.

12. The armored panel as recited in claim 11, wherein said intermediate layer extends between said front face layer and said backing layer at said flange edge structure.

13. An armored panel comprising:
   a front face layer;
   a hard ballistic material layer adjacent to said front face layer;
   a compressed oriented fiber spall shield layer bonded to a rear face of said hard ballistic material layer;
   a spacer layer bonded to a rear face of said compressed oriented fiber spall shield layer; and
   a backing layer adjacent to said spacer layer to at least partially encapsulate said hard ballistic material layer, said compressed oriented fiber spall shield layer and said spacer layer, said backing layer adjacent to said front face layer along at least one edge of the armored panel to form a flange edge structure 14. The armored panel as recited in claim 13, wherein said spacer layer provides a receipt area for a preformed component.

15. The armored panel as recited in claim 14 wherein said spacer layer includes a molded insert to at least partially support said preformed component.

16. The armored panel as recited in claim 13, further comprising an intermediate layer intermediate said spacer layer and said compressed oriented fiber spall shield layer.

17. The armored panel as recited in claim 16, wherein said intermediate layer extends between said front face layer and said backing layer at said flange edge structure.

18. The armored panel as recited in claim 17, wherein said front face layer, said intermediate layer and said backing layer are manufactured from a polymer matrix composite glass fabric cloth.

19. The armor system as recited in claim 8, further comprising a metallic alloy shell which encapsulates said rear face CMC layer and said monolithic ceramic layer to maintain said layers in compression.

20. The armor system as recited in claim 1, further comprising a metallic alloy shell which encapsulates said rear face CMC layer and said monolithic ceramic layer to maintain said layers in compression.

21. The armor system as recited in claim 20, wherein said backing layer is adjacent to said front face layer along at least one edge of the armored panel to form a flange edge structure.

22. The armor system as recited in claim 8, wherein said hard ballistic material layer further comprises:

a monolithic ceramic layer; and a rear face Ceramic Matrix Composite (CMC) layer bonded to a rear face of said monolithic ceramic layer.

23. The armor system as recited in claim 13, wherein said hard ballistic material layer further comprises:

a monolithic ceramic layer; and a rear face Ceramic Matrix Composite (CMC) layer bonded to a rear face of said monolithic ceramic layer.

* * * * *